Patented Dec. 21, 1937

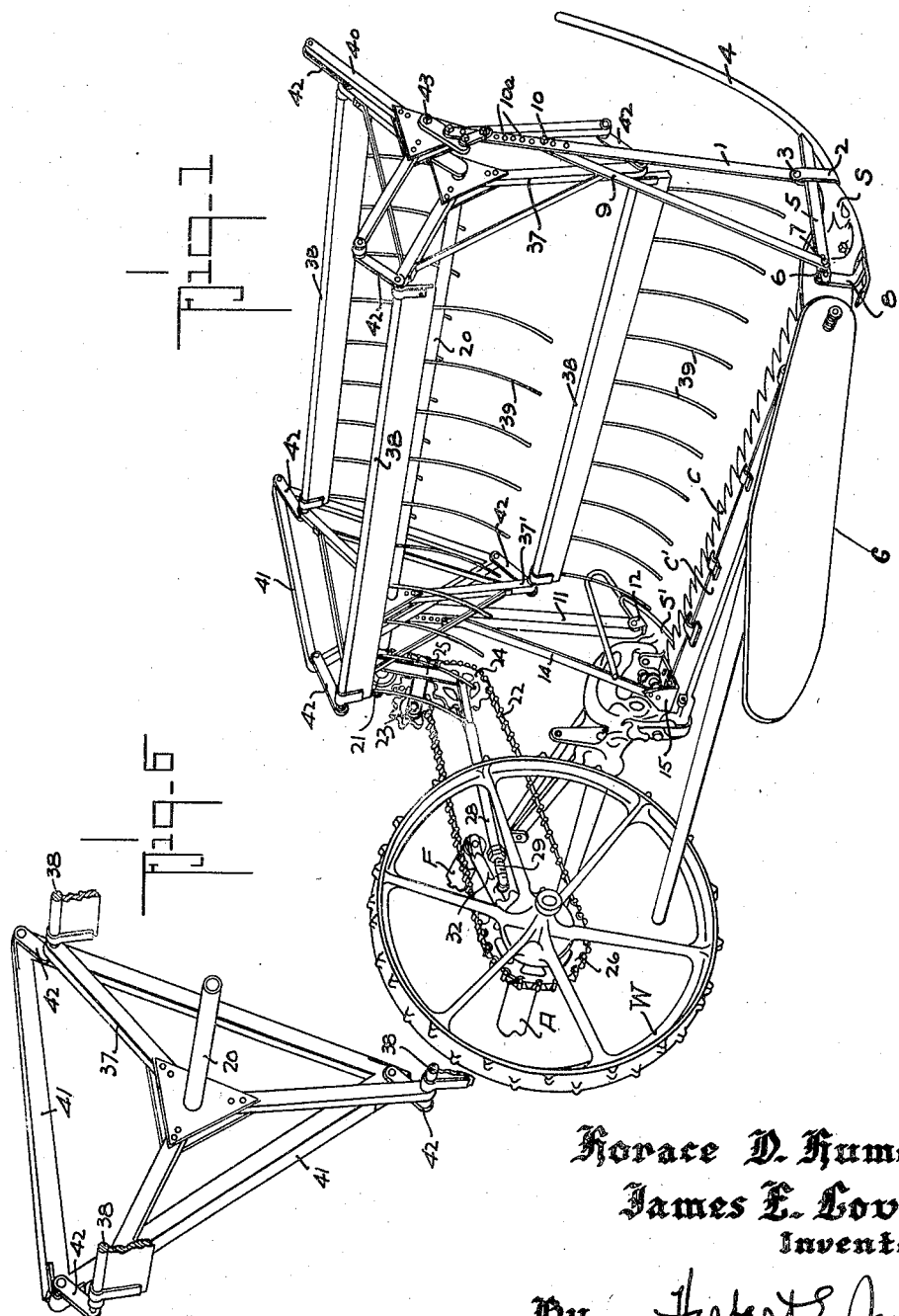

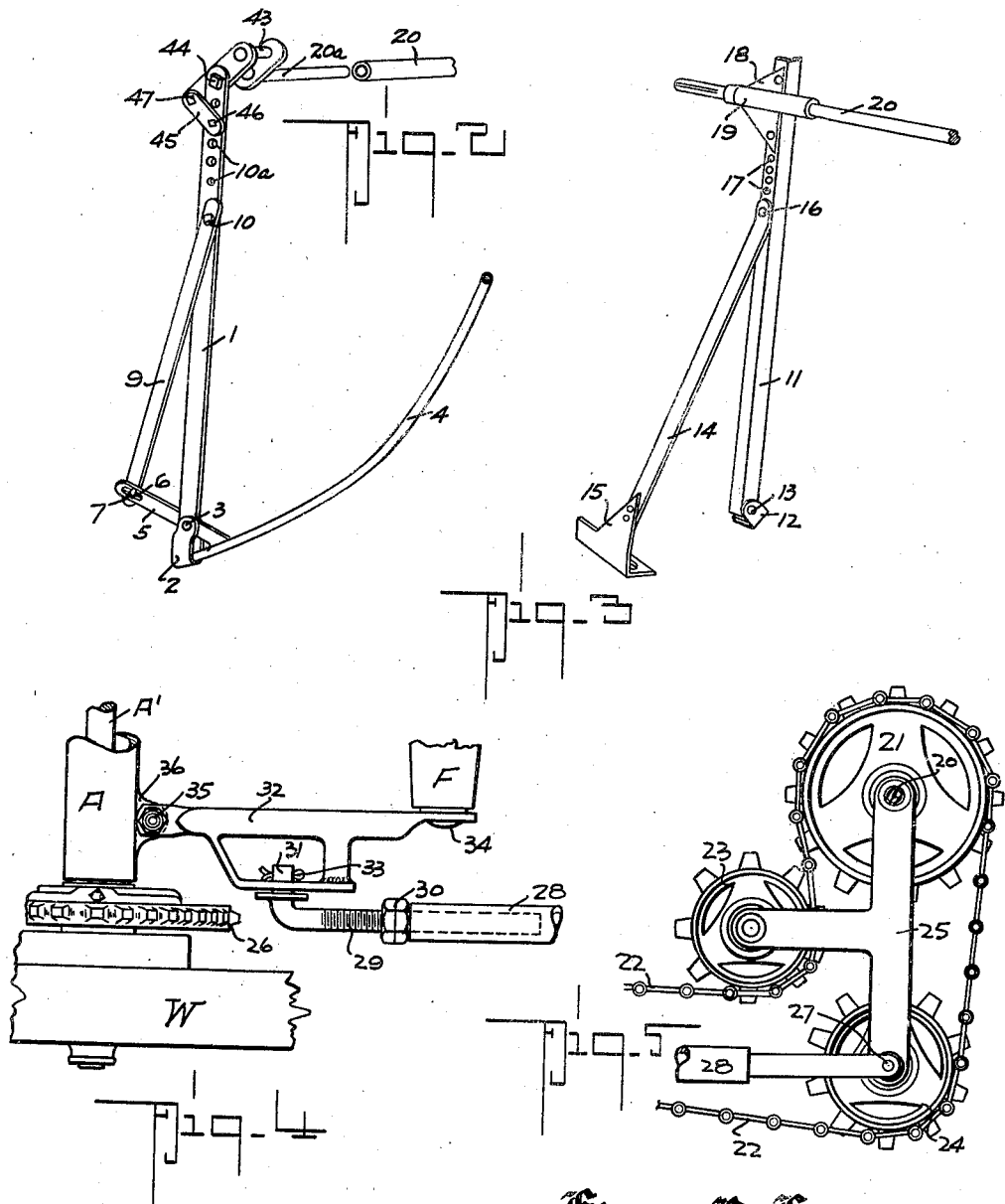

2,102,711

UNITED STATES PATENT OFFICE 2,102,711

HARVESTING MACHINE

Horace D. Hume and James E. Love, Garfield, Wash., assignors to Hume-Love Company, Garfield, Wash., a corporation Application May 23, 1936, Serial No. 81,418

5 Claims. (Cl. 56—224)

Our present invention relates to improvements in harvesting machines of the foldable and adjustable, reciprocating side-cutter type, in which the side cutter, or sickle is driven through the operation of a traction wheel. In carrying out our invention we provide an attachment for the harvesting machine involving a rotary reel located above and slightly in advance of the sickle or cutter and driven from the traction wheel of the machine, for cooperation with the cutter in lifting and gathering fallen grain, a down crop, lodged grain, vines, and other crops that grow close to the ground. The tines of the rotary reel lift the crop to proper position for cutting, and then they pass the cut crop to the rear of the cutter for handling by other accessories of the harvesting machine.

The present invention consists essentially in novel combinations and arrangements of parts embodied in the harvesting attachment whereby the rotary reel and its accessories may with facility be mounted on the harvester, accurately adjusted for maximum efficiency in the performance of its functions, in the use of simple but effective driving mechanism by means of which power is transmitted from the traction wheel of the harvester to the reel, and in other features to be hereinafter pointed out. In the structure of the rotary reel attachment means are provided for insuring rigidity in the adaptation of the rotary reel to the present day sickles or cutters, which are standardized in comparatively long structures and therefore require correspondingly long reels. Means are also provided for properly adjusting, setting, and aligning the rotary reel with relation to the sickle; and for feathering the tines of the reel, or imparting thereto a supplemental movement in addition to the rotation of the reel for maintaining the tines in effective working position to pick up the crop.

In the accompanying drawings we have illustrated one complete example of the physical embodiment of our invention in which the parts are combined and arranged according to one mode we have thus far devised for the practical application of the rotary reel attachment to a harvester of the sickle type; it will however be understood that changes and alterations may be made in these exemplifying structures within the scope of our claims without departing from the principles of the invention.

Figure 1 is a perspective view of the rotary reel attachment of our invention, showing the traction wheel of the harvester as the prime mover for the reel, together with the sickle and parts of the harvester frame that are necessary for the support of the attachment.

Figure 2 is a perspective view of the supporting means, or reel mount for the outer end of the reel, which mount is located at the outer end of the cutter or sickle; and Figure 3 is a perspective view of the reel mount at the inner end of the reel and sickle.

Figure 4 is a detail, top plan view, showing part of the traction wheel of the harvester, and the adjustable supporting frame for the reel driving mechanism.

Figure 5 is a detail side elevation showing the driven sprocket wheels that operate the reel.

Figure 6 is a detail perspective of the reel-head at the inner end of the reel, showing also a reinforcing frame that operates in connection with the supplemental movement of the tines on the rotary reel.

In order that the general arrangement and relation of parts may readily be understood we have indicated the traction wheel W of the harvester as the prime mover for the rotary reel, and the relation thereto of the axle or housing A and shaft A' is also indicated in Figure 4. The side cutter or sickle C and cutter bar C' are of standard type, and the cutting mechanism is equipped with the usual outside guard or divider G, the outside, pointed supporting shoe S and the inside supporting shoe S'. The main frame or stationary supporting means F of the harvester is employed for supporting the adjusting frame of the driving mechanism, and the rotary reel is mounted on the sickle, or cutting mechanism.

In Figure 2, the outside reel-mount is illustrated, detached and in Figure 1 the mount is shown supported at the outer end of the sickle. This mount includes an upright standard I which is provided at its lower end with a loop 2 that is bolted at 3 to the lower end of the standard, and as indicated in Figure 1, this loop is slipped over and forced into frictional contact with the pointed nose or front end of the outside shoe S of the sickle. An upwardly curved finger bar or divider 4 is fixed at its rear, lower end to the loop and is designed to divide the standing grain or the crop to be cut from the remainder of the field, as the swath is cut by the advancing harvester.

At the lower end of the standard a rearwardly extending, approximately horizontal, base bar 5 is secured, and the rear end of this base bar is slotted at 6 and bolted at 7 to an angle bracket 8 bolted rigidly to the shoe S, thus providing a spaced front and rear support for attachment of the reel-mount to the shoe, and the standard is further reinforced by the use of a diagonal brace 9 bolted at 7 to the bracket, and the upper end of this brace is bolted at 10 in a selected one of a series of bolt holes 10a at the upper end of the standard. By this construction of the reel mount, the latter may readily be adjusted to varying conditions in the shoe S and to positions of the cutter, in different harvesting machines, and after proper adjustment, the mount is rigidly fixed in proper position to support the rotary reel.

The mount for the inner end of the reel, indicated in Figure 3 also comprises a standard 11 having a clip 12 pivoted at its lower end, as at 13, and this loop is bolted to the forward pointed end of nose of the inner shoe S' and firmly secured thereon by means of a bolt (not shown). The standard 11 is reinforced by a diagonal brace 14, which at its lower end is bolted or riveted to an angle bracket 15, and the bracket is bolted to a part of the sickle frame. At its upper end the diagonal arm or brace 14 is bolted at 16 in a selected one of the series of bolt holes 17 in the standard 11, and when the parts are thus secured they form a rigid mount or support for the inner end of the rotary reel.

At the upper end of the standard 11 a bearing bracket 18 is bolted, and this bracket has an integral or rigid journal bearing sleeve 19 in which one end of the reel shaft 20 is journaled, and the shaft as indicated projects through the journal bearing; the other end of the reel shaft is journaled in bearings as will be described.

The power transmission through which the rotary reel is operated includes a large driven sprocket wheel 21 (Fig. 5) on the shaft 20, and the drive chain or sprocket chain 22 passes around this main sprocket and also around a pair of guide sprocket wheels 23 and 24 mounted in the sprocket-frame 25, which is suspended on the reel shaft 20.

After passing around the set of three driven sprocket wheels, the drive chain 22 passes rearwardly around the main drive sprocket 26 on the drive shaft A' of the harvester from which power is received for rotating the rotary reel through its shaft 20.

In combination with the driving mechanism for the shaft 20 and the frame 25 suspended on the reel shaft, and with the rigid axle or housing and frame member F of the parts shown in Figure 4, we employ an adjustable brace and frame that includes a rearwardly extending, tubular, extensible brace bar 28, pivoted at 27 to the lower end of the sprocket frame 25 and thus coupled with the journal for the lower sprocket wheel 24. This adjustable brace bar extends longitudinally of the harvester, and at its rear end the tubular bar is equipped with a bolt 29 threaded within the tubular bar, and lock nuts 30 are provided on the bolt to lock the tubular portion of the bar and the bolt in adjusted position. The rear end of this bolt is bent to form an angular head 31, which passes through a hole in a coupling frame 32 and a cotter pin 33 secures the head in position. The coupling frame 32 is bolted at 34 to a part of the main frame F of the harvester, and at its rear end the frame is coupled by bolt 35 to a pair of perforated ears 36 integral or rigid with the axle or housing A.

In Figure 5 it will be noted that the sprocket wheels forming the train of driven gearing are of differing sizes, and they are interchangeable to vary the speed of rotation of the rotary reel through the shaft 20. The tubular brace bar 28 may be extended to tighten the drive chain and properly adjust the position of the sprocket wheel-frame 25, and the flexible connection at 31 with the coupling frame 32 compensates for irregularities in the ground surface over which the two shoes S and S' pass, without disturbance to the normal tension of the drive chain. The rotary reel and the sickle bar thus move in unison over the ground surface, and the flexible arrangement involving the sprocket wheel frame, the adjustable brace bar, and the coupling frame 32, insure smooth operation of the driving mechanism for the reel at all times.

The rotary reel, which is mounted to rotate with shaft 20 has two spaced spider-heads as 37 and 37' mounted on the shaft, and each spider head comprises a number of radiating arms, here shown as three, in the free ends of which the opposite ends of the three tine bars 38 are journaled, and as shown, each tine bar is equipped with spaced tines 39 for gathering the crop and passing the crop past the cutter C.

In addition to the rotary movement of the reel, a supplemental movement is imparted to the tine bars to maintain the tines in effective working position to lift the crop while it is being cut, and to convey the cut crop to the rear of the sickle for subsequent handling and operations of the harvester.

The supplemental movement of the tine bars and tines is accomplished through the use of a pair of rotary frames 40 and 41 located outside of the spider heads of the reel, with an axial center eccentric to the reel shaft. These rotary frames, at their outer peripheries are pivotally connected by levers 42 to the ends of the tine bars 38, which bars protrude outwardly through the spider heads, and the tine bars are thus rotated in unison as the reel rotates.

One of the rotary frames, as the outer frame 40, is a substantial duplicate of the spider head 37, and this rotary frame is journaled on a fixed crank 43 rigid and forming an extension of a stud shaft 20a which extends into the open end or tubular portion of the shaft 20, and this stud forms a journal bearing for the reel shaft 20. The eccentric arrangement of the frame on the fixed crank, with relation to the reel shaft causes the supplemental movement of the rotary frames, the tine bars, and the tines.

As indicated in Figure 2 the crank 43 of the stud shaft 20a, is bolted at 44 in one of the bearing holes of the series 10a in the standard 1, and an adjusting link 45 is bolted at 46 to the standard and at 47 to the crank. By selecting a hole in the series 10a at the outer mount for the bolt 44, and adjusting the bracket 18 at the inner mount of the reel, the reel may be vertically adjusted with relation to the sickle.

The tine bars and their tines may be adjusted with relation to their two rotary frames 40 and 41 in order to present the tines of the bottom bar in proper position to convey the crop, by swinging or adjusting the crank 43 on its bolt 44, and then fastening the link 45 by means of its bolts 46 and 47 to hold the crank in its adjusted position.

Having thus fully described our invention, what we claim as new and desire to secure by Letters Patent is:

1. In a reel mount for a harvesting machine of the side cutting type, the combination with cutting mechanism and a pointed shoe forming a supporting means therefor, of a standard having a loop at its lower end frictionally engaging said pointed shoe, a rearwardly extending diagonal brace and adjustable means for securing the upper end of the brace to said standard, and means for rigidly attaching the spaced, lower end of said brace to the shoe.

2. The combination in a harvesting machine of the rotary reel type with adjustable mounts for the rotary reel and a driving shaft of the machine, of reel-driving mechanism actuated from said shaft and comprising a suspended sprocket-wheel-frame, interchangeable driven sprocket wheels mounted in said frame, and a flexible supporting connection between said frame and the machine.

3. The combination in a harvesting machine with adjustable mounts and an adjustable rotary reel supported in said mounts, of a suspended sprocket wheel frame and interchangeable driven sprocket wheels mounted in the frame, a coupling frame pivotally secured to said coupling frame and said wheel frame, and forming a flexible connection therebetween, a drive sprocket-wheel and shaft on the harvesting machine, and a driving chain mounted on the drive wheel and driven wheels.

4. The combination in a harvesting machine with spaced mounts and a rotary reel having a shaft supported therein, of a wheel-frame pivoted on said shaft and a plurality of sprocket wheels journaled in the frame, one of said wheels being mounted on the shaft, a drive chain passing over said wheels and a drive shaft and drive sprocket wheel for said chain, a detachable coupling frame mounted on the machine, and an adjustable brace bar pivotally mounted at its opposite ends in said wheel frame and said coupling frame.

5. The combination in a harvesting machine of the rotary reel type with a reel shaft and a main driven sprocket wheel thereon, of a wheel frame loosely suspended on said shaft and a pair of sprocket wheels journaled in the frame, a drive shaft and driving sprocket wheel forming part of the machine and a drive chain passing over said sprocket wheels, a coupling frame mounted on the machine, a brace bar pivoted to the wheel-frame, said bar comprising an adjusting bolt threaded in said bar, a bent head on the bolt, and said bent-head having a pivotal support in the coupling frame.

HORACE D. HUME.
JAMES E. LOVE.